United States Patent
Barsotti et al.

(12)

(10) Patent No.: US 6,551,712 B2
(45) Date of Patent: Apr. 22, 2003

(54) MAR-RESISTANT OLIGOMERIC-BASED COATINGS

(75) Inventors: Robert John Barsotti, Franklinville, NJ (US); Isidor Hazan, Southfield, MI (US); Bruce Lyle Neff, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/109,945

(22) Filed: Mar. 28, 2002

(65) Prior Publication Data

US 2002/0182420 A1 Dec. 5, 2002

Related U.S. Application Data

(62) Division of application No. 09/180,509, filed as application No. PCT/US97/08179 on May 14, 1997, now Pat. No. 6,376,596.

(51) Int. Cl.[7] .......................... B32B 27/30; B32B 27/38; B32B 27/42

(52) U.S. Cl. .................. 428/413; 428/422.8; 428/423.1; 428/480; 428/500

(58) Field of Search .............................. 428/413, 422.8, 428/423.1, 500, 400

(56) References Cited

FOREIGN PATENT DOCUMENTS

| WO | WO96 01864 | 1/1996 |
|---|---|---|
| WO | WO97 44402 | 11/1997 |

*Primary Examiner*—Ana Woodward
(74) *Attorney, Agent, or Firm*—Sudhir G. Deshmukh

(57) ABSTRACT

A curable coating composition comprising functionalized oligomer components i and ii which cross-link at cure to form a three-dimensional network having chains of substantially uniform, controllable molecular weight between cross-links; oligomers i and ii having weight average molecular weights not exceeding about 3,000, a polydispersity for (i) not exceeding about 1.5, and functionalities that react with one another to cross-link i and ii at cure to yield coatings with an excellent balance of hardness and mar resistance.

1 Claim, No Drawings

MAR-RESISTANT OLIGOMERIC-BASED COATINGS

This application is a divisional of application of Ser. No. 09/810,509 filed on Nov. 12, 1998, now U.S. Pat. No. 6,376,596, which is a 371 of PCT/US97/08179 filed on May 14, 1997.

BACKGROUND OF THE INVENTION

The present invention relates to a curable coating composition particularly useful as a topcoat in multi-layered coating systems.

Basecoat-clearcoat systems have found wide acceptance in the past decade as automotive finishes. Continuing effort has been directed to such coating systems to improve the overall appearance, the clarity of the topcoat, and the resistance to deterioration. Further effort has been directed to the development of coating compositions having low volatile organic content (VOC). A continuing need exists for coating formulations which provide outstanding performance characteristics after application, and particularly mar-resistance and resistance to environmental etching. Heretofore, mar-resistant coatings were attained by softening the coating, which depreciates other performance characteristics. The instant invention overcomes this problem.

SUMMARY OF THE INVENTION

This invention concerns a curable coating composition of a binder in an organic solvent, the composition having a volatile organic content not exceeding about 0.4 kilograms per liter, comprising:
  i) a binder selected from a linear or branched cycloaliphatic moiety-containing oligomer or blend of oligomers with a weight average molecular weight not exceeding about 3,000, a polydispersity not exceeding about 1.5 and functionality A or A plus B; and
  ii) an optional oligomeric crosslinker or blend of crosslinkers with a weight average molecular weight not exceeding about 3,000 and functionality C or C plus D;
components i and ii reacting at cure to form a three-dimensional network having chains of substantially uniform, controllable molecular weight between crosslinks.

Preferred functionalities in oligomeric components i and ii are as follows:

| COMPONENT (i) | COMPONENT (ii) |
|---|---|
| A = hydroxyl | C = isocyanate |
| A = hydroxyl | C = melamine |
| A = anhydride | C = epoxy |
| A = anhydride | C = epoxy; D = hydroxyl |
| A = acid | C = epoxy |
| A = acid; B = hydroxyl | C = epoxy; D = melaniine |
| A = epoxy | C = isocyanate |
| A = epoxy; B = hydroxyl | C = isocyanate |
| A = aldimine | C = isocyanate |
| A = aldimine; B = hydroxyl | C = isocyanate |
| A = ketimine | C = isocyanate |
| A = ketimine; B = hydroxyl | C = isocyanate |
| A = silane | C = silane |
| A = silane; B = hydroxyl | C = melamine |
| A = silane; B = hydroxyl | C = isocyanate |
| A = silane; B = epoxy | C = acid; D = melamine |

The compositions of this invention, comprising (i) when (i) is self-crosslinking, or, (i) plus (ii), may also contain up to a total of about 30% based on the total binder of a noncyclic oligomer and/or an acrylic polymer and/or a dispersed macromolecular polymer as described in more detail hereafter. This invention also concerns a method for coating a substrate comprising applying the disclosed composition thereto and curing the composition; as well as a substrate coated with the composition. The term "isocyanate(s)" employed herein includes blocked isocyanate(s) as well.

DETAILS OF THE INVENTION

The compositions of this invention form structured polymer networks of high hardness and excellent mar resistance. The functionality of these oligomers is predictably (nonrandomly) located versus polymers in which functionality is randomly distributed and whose polydispersities generally exceed 2.0. By "polydispersity" is meant weight average molecular weight divided by number average molecular weight, both measured by gel permeation chromatography. In compositions of this invention, molecular weight between crosslinks can be controlled to form more uniform networks minimizing short, embrittling lengths and long, softening lengths; minimizing soluble non-functional materials in the network and maximizing the toughness of the films (energy to break). These systems develop open networks with high molecular weight between crosslinks, vs. polymeric systems, at relatively high Tg's.

The Tg of these systems can be controlled to give a maximum balance of mar; hardness, durability, and etch. In measuring Tg of crosslinked films made from compositions of this invention using dynamic mechanical analysis, the Tg regime is characterized by a steep slope versus a gradual slope for a random system based on polymers. The reactivity of these systems is such that complete reaction is attainable to minimize hydrophilic groups. These systems are typically baked at 120° to 141° C. (250° to 285° F.), but can be cured at lower temperatures through the use of more reactive groups and catalysis.

Representative of the functionalized oligomers that can be employed as component i or ii are the following:

Acid Oligomers: The reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like.

Hydroxyl Oligomers: The above acid oligomers further reacted with monofunctional epoxies such as butylene oxide, propylene oxide, and the like.

Anhydride Oligomers: The above acid oligomers further reacted with ketene.

Silane Oligomers: The above hydroxyl oligomers further reacted with isocyanato propyl trimethoxy silane.

Epoxy Oligomers: The diglycidyl ester of cyclohexane dicarboxylic acid, such as Araldite® CY-184 from Ciba Geigy, and cycloaliphatic epoxies, such as ERL®-4221, and the like from Union Carbide.

Isocyanate Oligomers: The isocyanurate trimer of hexamethylene diisocyanate, DESMODUR® 3300 from Bayer or Tolonate HDTâ from Rhone-Poulenc, and the isocyanurate trimer of isophorone diisocyanate, and the like.

Aldimine Oligomers: The reaction product of isobutyraldehyde with diamines such as isophorone diamine, and the like.

Ketimine Oligomers: The reaction product of methyl isobutyl ketone with diamines such as isophorone diamine.

Melamine Oligomers: Commercially available melamines such as CYMEL® 1168 from Cytec Industries, and the like.

AB-Funtionalized Oligomers: Acid/hydroxyl functional oligomers made by further reacting the above acid oligomers with 50%, based on equivalents, of monofunctional epoxy such as butylene oxide or blends of the hydroxyl and acid oligomers mentioned above or any other blend depicted above.

CD-Functionalized Crosslinkers: Epoxy/hydroxyl functional crosslinkers such as the polyglycidyl ether of Sorbitol DCE-3586 from Dixie Chemical or blends of the hydroxyl oligomers and epoxy crosslinkers mentioned above or any other blend as depicted above.

The compositions of this invention may additionally contain up to 30% by weight of binder of a noncyclic oligomer, i.e., one that is linear or aromatic. Such noncyclic oligomers can include, for instance, succinic anhydride- or phthalic anhydride-derived moieites in the "Acid Oligomers" such as described above.

Preferred oligomers (i) have weight average molecular weight not exceeding about 3,000 with a polydispersity not exceeding about 1.5; more preferred oligomers have molecular weight not exceeding about 2,500 and polydispersity not exceeding about 1.4; most preferred oligomers have molecular weight not exceeding about 2,200, and polydisperity not exceeding about 1.25. The compositions of this invention can comprise 100% by weight of component (i) when (i) is a self-crosslinker. More typically, compositions will comprise 20–80 weight percent of (i), preferably 30 to 70 weight percent and more preferably 40 to 60 weight percent, with the balance being (ii).

The present coating composition can further comprise a functional amount of catalyst, generally about 0.1 to 5 weight percent, based on the weight of solids in the formulation. A wide variety of catalysts can be used, such as dibutyl tin dilaurate for isocyanate based reactions, tertiary amines such as triethylenediamine or phosphonium based catalysts for epoxy reaction and sulfonic acids, such as dodecylbenzene sulfonic acid for melamine reactions.

The coating compositions of the present invention are formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

The coating compositions of the present invention can also contain up to 30% of total binder of an acrylic polymer of weight average molecular weight greater than 3,000, or a conventional polyester such as SCDO-1040 from Etna Product Inc. for improved appearance, sag resistance, flow and leveling and such. The acrylic polymer can be composed of typical monomers such as acrylates, methacrylates, styrene and the like and functional monomers such as hydroxy ethyl acrylate, glycidyl methacrylate, or gamma methacrylyl propyl trimethoxy silane and the like.

The coating compositions of the present invention can also contain up to 30% of total binder of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 microns. The arms, attached to the core, make up about 10 to 90%, preferably 10 to 59%, by weight of the dispersed polymer, and have a weight average molecular weight of about 1,000 to 30,000, preferably 1,000 to 10,000.

The macromolecular core of the dispersed polymer is comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates.

The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

The coating compositions of the present invention can also contain conventional additives such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The coating compositions are typically applied to a substrate by conventional techniques such as spraying, electrostatic spraying, roller coating, dipping or brushing. The present formulations are particularly useful as a clear coating for outdoor articles, such as automobile and other vehicle body parts. The substrate is generally prepared with a primer and or a color coat or other surface preparation prior to coating with the present compositions.

After application to a substrate, the present compositions can be cured by heating to a temperature of about 120°–150° C. for a period of about 15 to 90 minutes.

The present invention is further illustrated by the following Procedures and Examples, in which parts and percentages are by weight unless otherwise indicated. VOC determinations are made by the procedure of ASTM method D3960.

PROCEDURE 1

TETRA HYDROXYL FUNCTIONAL OLIGOMER

Preparation of Acid Oligomer

To a 12-liter flask fitted with an agitator, condenser, heating mantle, nitrogen inlet, thermocouple and an addition port was added 2447.2 gms of propylene glycol monomethylether acetate, 792.4 gms of pentaerythritol and 1.36 gms of triethylamine. The reaction mixture was agitated and heated to 140° C. under a nitrogen blanket at which time 3759 gms of methyl hexahydrophthalic anhydride was added over 6 hrs. The reaction mixture was then held at 140° C. until no anhydride bands were observed on an infrared spectroscopic trace.

Preparation of Diol

To a 5-liter flask fitted with an agitator, condenser, heating mantle, nitrogen inlet, thermocouple and an addition port was added 2798.4 gms of acid oligomer prepared above and 2.76 gms of triethylamine. The mixture was agitated and heated to 60° C. under nitrogen. Then, 696.9 gms of 1,2-epoxy butane was added over 120 mins, after which the temperature was raised to 105° C. and held at that temperature until the acid number dropped to about 10 or less. Percent weight solids were 71.5, Gardner viscosity V, number average molecular weight 895 and weight average molecular weight 1022 as determined by GPC (polystyrene standard).

PROCEDURE 2

DI HYDROXYL FUNCTIONAL OLIGOMER

Preparation of Acid Oligomer

To a 12-liter flask fitted with an agitator, condenser, heating mantle, nitrogen inlet, thermocouple and an addition port was added 2434.5 gms of propylene glycol monomethylether acetate, 1222.5 gms of hexane diol and 1.37 gms of triethylamine. The reaction mixture was agitated and heated to 140° C. under a nitrogen blanket at which time 3341.6 gms of methyl hexahydrophthalic anhydride was added over 6 hrs. The reaction mixture was then held at 140° C. until no anhydride bands were observed on an infrared spectroscopic trace.

Preparation of Oligomeric Diol

To a 5-liter flask fitted with an agitator, condenser, heating manntle, nitrogen inlet, thermocouple and an addition port was added 2020.4 gms of acid oligomer prepared above and 2.45 gms of triethylamine. The mixture was agitated and heated to 60° C. under nitrogen. Then, 478.3 gms of 1,2-epoxy butane was added over 120 mins, after which the temperature was raised to 105° C. and held at that temperature until the acid number dropped to about 10 or less. Percent weight solids were 69.5, Gardner viscosity A, number average molecular weight 679 and weight average molecular weight 770 as determined by GPC (polystyrene standard).

PROCEDURE 3

| HYDROXYL/SILANE OLIGOMER | |
|---|---|
| The oligomer from Procedure 2 was further reacted by mixing di hydroxyl functional oligomer | 250 |
| isocyanato propyl trimethoxy silane | 60.9 |
| 1% dibutyl tin dilaurate in methylethyl ketone (MEK) | 0.25 |

The above mixture was heated at 60° C. for 3 days. The completion of the reaction was monitored by infra red spectroscopy. The reaction was complete when there was essentially no isocyanate absorption in the IR.

PROCEDURE 4

ANHYDRIDE OLIGOMER

The anhydride oligomer was prepared from a tetra-functional half-acid ester. The following constituents were charged to a reaction vessel equipped with a heating mantle, reflux condenser; thermometer, nitrogen inlet, and stirrer:

|  | Parts by Weight |
|---|---|
| Portion I | |
| pentaerythritol | 478.0 |
| methyl hexahydrophthalic anhydride | 2250.0 |
| triethylamine | 0.5 |
| Portion II | |
| xylol (135°–145° C.) | 2250.0 |
| Total | 4978.5 |

Portion 1 was charged into the reaction vessel, heated to 180° C. under a nitrogen blanket and held for 30 minutes. After the hold period, the reaction mixture was cooled and Portion 2 added.

The solution prepared above was used to make a linear pendant anhydride. The solution was charged into a 5 L flask equipped with a stirrer and a gas inlet tube. The gas inlet tube was attached to a ketene generator similar to the one described by Williams et al in the Journal of Organic Chemistry 5, 122, 1940. Ketene was bubbled through the solution until all of the acid groups were converted to anhydride groups. Solvent was then removed under vacuum to give a linear pendant anhydride with the following characteristics:

percent weight solids: 78.0
anhydride eq. wt.: 329±4 (on solution basis)
acid eq. wt.: 6176±1323 (on solution basis)
weight average mol wt.=1100.

EXAMPLE 1

ISOCYANATE CLEAR

|  | Parts by Weight |
|---|---|
| Part I | |
| tetra hydroxyl functional oligomer (Procedure 1) | 217.71 |
| di hydroxyl functional oligomer (Procedure 2) | 149.24 |
| propylene glycol mono methyl ether acetate (PM acetate) | 26.14 |
| Tinuvin® 384 (UV screener from Ciba Geigy) | 8.94 |
| Tinuvin® 292 (hindered amine light stabilizer from Ciba Geigy) | 6.72 |
| 10% BYK-301O (flow additive from BYK Chemie) in PM acetate | 1.78 |
| 10% di butyl tin dilaurate in methyl ethyl ketone | 1.12 |
| butyl acetate | 52.27 |
| Part II | |
| Tolonate® HDT (isocyanurate trimer of hexamethylene diisocyanate from Rhone-Poulenc) | 192.23 |

This coating was sprayed over a black waterborne basecoat which had already received a warm air flash of 5 min at 82° C (180° F). The coating was cured for 30 min at 141° C. (285° F.). The coating exhibited excellent appearance, hardness and mar resistance. This coating exhibited higher hardness and significantly better mar resistance than a standard coating made at a similar final film Tg using a routine hydroxyl functional acrylic polymer (6,000 weight average molecular weight polymer with 32% hydroxy ethyl acrylate). The acrylic resin was substituted for the oligomer on an equivalent basis.

| PROPERTY | OLIGOMERIC 2K CLEAR | POLYMERIC 2K CLEAR |
|---|---|---|
| Glass Transition Temperature[1] | 42.7° C. | 48.1° C. |
| Hardness[2] | 141 N/mm$^2$ | 130 N/mm$^2$ |
| Wet mar[3] | 80% | 50.6% |
| Dry mar[4] | 94.2% | 65.5% |

[1]as measured by differential scanning calorimetry
[2]as measured using a Fischerscope® hardness tester (the measurement is in Newtons per square millimeter)
[3]the surface of a panel is marred using a 3% slurry of aluminum oxide in water and a felt pad, the marring is accomplished using a Daiei® Rub Tester. The test uses 10 cycles with a weight of 500 grams. The rating shown is the percent of the surface which is not marred as measured by image analysis.
[4]the surface of a panel is marred using Bon Ami® Cleanser and a felt pad, the marring is accomplished using a Daiei® Rub Tester. The test uses 15 cycles with a weight of 700 grams. The rating shown is the percent of the surface which is not marred as measured by image analysis.

EXAMPLE 2

ANHYDRIDE/EPOXY CLEAR

| | Parts by Weight |
|---|---|
| Part I | |
| anhydride oligomer (Procedure 4) | 763.08 |
| Tinuvin® 384 (UV screener from Ciba Geigy) | 19.08 |
| Tinuvin® 292 (hindered amine light stabilizer from Ciba Geigy) | 13.74 |
| 5% BYK-301® (flow additive from BYK Chemie) in PM acetate | 56.4 |
| 25% tetra butyl phosphonium chloride in PM acetate | 19.84 |
| butyl acetate | 97.0 |
| Part II | |
| diglycidyl ester of cyclohexane dicarboxylic acid | 358.65 |

This coating was sprayed over a black waterborne basecoat which had already received a warm air flash of 5 min at 82° C. The coating was cured for 30 min at 141° C. This coating exhibited excellent appearance, hardness, cure and durability. This coating exhibited significantly better durability than a similar coating based on a standard acrylic anhydride polymer (a 6,000 weight average molecular weight polymer containing 27% itaconic anhydride). The acrylic was substituted for the oligomer on an equivalent basis. On accelerated QUV testing (using an FS-40 bulb), the polymeric anhydride based coating cracked after 4,000–6,000 hours of exposure; the oligomeric based coating showed no cracking and had excellent gloss at over 10,000 hours of exposure.

EXAMPLE 3

MELAMINE CLEAR

| | Parts by Weight |
|---|---|
| Part I | |
| tetra hydroxyl functional oligomer (Procedure 1) | 16.1 |
| di hydroxyl functional oligomer (Procedure 2) | 16.6 |
| Cymel® 1168 (melamine from Cytec Ind.) | 16.1 |
| 20% BYK-301® (flow additive from BYK Chemie) in PM acetate | 0.4 |
| catalyst solution* | 0.8 |
| *catalyst solution | |
| Cycat® 600 (sulfonic acid from American Cyanamid) | 48.0 |
| AMP-95® (amine from Angus Chemical) | 10.8 |
| methanol | 41.2 |

This coating was applied over a black waterborne basecoat which had already received a warm air flash of 5 min at 82° C. The coating was cured for 30 min at 141° C. This coating exhibited good appearance, hardness, and mar resistance.

EXAMPLE 4

SILANE (a)/HYDROXYL (b)/ISOCYANATE (c)

| | Parts by Weight |
|---|---|
| Part I | |
| tetra hydroxyl functional oligomer (Procedure 1) | 243.5 |
| hydroxyl/silane oligomer (Procedure 3) | 175.9 |
| Tinuvin® 384 (UV screener from Ciba Geigy) | 9.47 |
| Tinuvin® 292 (hindered amine light stabilier from Ciba Geigy) | 6.97 |
| 10% BYK-301® (flow additive from BYK Chemie) in PM acetate | 3.29 |
| 10% di butyl tin dilaurate in butyl acetate | 1.04 |
| butyl acetate | 26.3 |
| PM acetate | 26.3 |
| Part II | |
| Tolonate® HDT (isocyanurate trimer of hexamethylene diisocyanate from Rhone-Poulenc) | 157.2 |

This coating was sprayed over a black waterborne basecoat which had already received a warm air flash of 5 min at 82° C. The coating exhibited excellent appearance, hardness and mar resistance.

EXAMPLE 5

A.) Nonaqueous Dispersion

To a 5-liter flask fitted with a agitator, thermometer, condenser and addition funnels was added the following ingredients. The mixture was agitated under nitrogen and temperature raised to reflux (100° to 104° C.). Ingredients are given in parts by weight (to the nearest whole number, for most). The dispersed polymer is 63.5% weight solids in toluene having a weight average molecular weight of 8100. The composition was as follows:

| STY(BA/BMA/HEA/MAA/GMA (14.7/43.6/27.5/10.1/2.3/1.7) | |
|---|---|
| dispersed polymer | 206 |
| isoprapanol | 12 |
| spirits | 94 |
| heptane | 53 |
| butanol | 3 |

Added as a shot at reflux was t-butyl peroctoate (0.5 parts) and mineral spirits (5 parts). Then, the following ingredients were added over a 210 minute period at reflux:

| styrene | 52 |
|---|---|
| hydroxy ethylacrylate | 86 |
| methyl methacrylate | 126 |
| glycidyl methacrylate | 5 |
| methacrylic acid | 14 |
| methyl acrylate | 62 |
| dispersed polymer | 103 |

These ingredients were added next and the reaction held for 45 minutes:

| butanol | 12 |
|---|---|
| heptane | 17 |
| t-butyl peroctoate | 5 |
| mineral spirits | 31 |

Butanol (16 parts) and t-butyl peroctoate (1.7 parts) were then added over a 30 minute period and the reaction was held for 60 minutes. Finally, the reactor was stripped of 76 parts of solvent. The particle size was 298 nm as measured by quasielastic light scattering and had a room temperature viscosity of 2000 centipoise at 5 rpm on a Brookfield viscometer and a weight solids of 63.5 percent.

B.) Acrylosilane Resin

The resin was made by this procedure: charge 400 g of 2 ethyl hexanol and 400 g of N-pentyl propionate to a 5 liter flask. Heat to reflux. Premix and add 896 g of styrene, 672 g of gamma methacryl propyl trimethoxy silane, 336 g of 2-ethyl hexyl methacrylate, 336 g of hydroxypropyl methacrylate, 170.2 g of 2.2(2 methyl butane nitrite), 40 g of 2 ethyl hexanol, and 40 g of N-pentyl propionate to the refluxing material over a period of six hours. After the addition, hold the temperature for 30 minutes. Then, add a premixed blend of 40 g of 2 ethyl hexanol, 40 g of N-pentyl propionate and 9 g of 2.2(2 methyl butane nitrile) over a 30 minute period. Hold the temperature for 30 minutes after addition, then cool and empty.

| Gardner Holt Viscosity | Weight Solids | Weight Ave. M.W. |
|---|---|---|
| X + ½ | 73.3% | 5686 |

C.) Cyclosilane Oligomer (i)

Place some cyclohexanedimethanol in the oven to melt. Once melted, take 294.7 g of cyclohexanedimethanol along with 0.11 g FascatÒ 420 (tin catalyst from Elf Atochem) and place in a flask at about 35° C. Then, add 839 g of isocyanate propyl trimethoxysilane over 75 minutes. Then hold for two hours. Cool and empty.

| Gardner Holt Viscosity | Weight Solids | Weight Ave. M.W. |
|---|---|---|
| V | 90% | 1550 |

D.) Silanated Star Polyester (i) Step I: Add the following ingredients to the reactor, heat to 120° C.-125° C. Allow batch to exotherm to 145° C. If exotherm does not happen heat to 145° C. Hold for 1 hour at 145° C. before proceeding.

| Ingredient | Weight |
|---|---|
| pentaerythritol | 280.2 |
| 4-methyl hexahydrophthalic anhydride | 1037.8 |
| butyl acetate | 161.1 |

Step II: Feed the ingredients over 30 minutes at 145° C. Maintain the 145° C. temperature.

| Cardura E (monoepoxy from Shell Chemical) | 1561.9 |
|---|---|
| butyl acetate | 182.3 |

Step III: Add as a shot to reactor. Heat to 175° C. Record Acid Number vs. time profile, every 30 minutes after reaching 175° C., until it stabilizes.

| dibutyltin dilaurate | 2.9 |
|---|---|
| butyl acetate | 71.7 |

Step IV: Once acid number has stabilized, cool to below 100° C. Dilute with butyl acetate.

| butyl acetate | 302 |
|---|---|
| Batch Total | 3600 | wt. solids 80%
Acid Number<2.

In a reaction flask, place 3720 g of the star polyester made immediately above, 1524 g of isocyanate propyl trimethoxysilane and 0.1 g Fascat 420 catalyst. Stir for 90 minutes. Blanket the whole time with $N_2$.
wt. solids=86.3
Wt. Ave M.W.=2200

| E.) Clearcoat Composition | Grams |
|---|---|
| Resimineo 6550 (melaniine from Monsanto) | 14.43 |
| Nonaqueous Dispersion (A) | 26.77 |
| Acrylosilane Resin (B) | 11.6 |
| Cyclosilane Oligomer (C) | 22.22 |
| Silanated Star Polyester (D) | 23.17 |
| Catalyst Solution* | 3.55 |
| Dibutyltin Dilaurate | 0.2 |

-continued

| E.) Clearcoat Composition | Grams |
|---|---|
| Resiflow S̀ò | 0.4 |
| (acrylic flow agent from Estron Chemical) | |
| Tinuvin 384 | 2.32 |
| (UV Screener from CIBA Geigy) | |
| Tinuvin 123 | 2.2 |
| (Hindered Amine light stabilizer from CIBA Geigy) | |
| *Catalyst solution | |
| Cycato 600 (sulfonic acid from American Cyanamid) | 48.0 |
| AMP-95ò (amine from Angus Chemical) | 10.8 |
| methanol | 41.2 |

This coating was applied over a black waterborne basecoat which had already received a warm air flash of 5 min at 82° C. The coating was cured for 30 min at 141° C. This coating exhibited good appearance, hardness, etch and mar resistance.

What is claimed is:

1. A substrate coated with a curable coating composition of a binder in an organic solvent, the composition having a volatile organic content not exceeding 0.4 kilograms per liter, consisting essentially of:

i) a binder selected from a linear or branched cycloaliphatic moiety-containing oligomer or blend of said oligomers with a weight average molecular weight not exceeding 3,000, a polydispersity not exceeding 1.5 and functionality A or A plus B; and ii) an oligomeric crosslinker or blend of said crosslinkers with a weight average molecular weight not exceeding 3,000 and functionality C;

components i and ii reacting at cure to form a three-dimensional network having chains of substantially uniform, controllable molecular weight between crosslinks;

wherein:

said functionalities in components i and ii are selected from the group consisting of: A is hydroxyl and C is isocyanate; A is epoxy and C is isocyanate; A is hydroxyl and C is melamine; A is aldimine or ketimine, B is optionally hydroxyl, and C is isocyanate; A is epoxy, B is hydroxyl and C is isocyanate; and A is silane, B is hydroxyl and C is melamine.

* * * * *